United States Patent
Luz

(10) Patent No.: US 10,840,572 B1
(45) Date of Patent: Nov. 17, 2020

(54) SOLAR HYDROGEN GENERATION AND OFF-PEAK STORAGE

(71) Applicant: Denis Luz, Paradise Valley, AZ (US)

(72) Inventor: Denis Luz, Paradise Valley, AZ (US)

( * ) Notice: Subject to any disclaimer, the term of this patent is extended or adjusted under 35 U.S.C. 154(b) by 162 days.

(21) Appl. No.: 16/019,519

(22) Filed: Jun. 26, 2018

Related U.S. Application Data

(60) Provisional application No. 62/525,056, filed on Jun. 26, 2017.

(51) Int. Cl.
| | |
|---|---|
| *H01M 16/00* | (2006.01) |
| *H01M 8/0656* | (2016.01) |
| *F03D 9/10* | (2016.01) |
| *H02J 3/38* | (2006.01) |
| *F03D 9/00* | (2016.01) |

(52) U.S. Cl.
CPC ............ *H01M 16/003* (2013.01); *F03D 9/10* (2016.05); *H01M 8/0656* (2013.01); *H02J 3/383* (2013.01); *H02J 3/386* (2013.01); *H02J 3/387* (2013.01); *F03D 9/007* (2013.01); *F03D 9/008* (2013.01)

(58) Field of Classification Search
CPC ... H01M 16/003; H01M 8/0656; F03D 9/007; F03D 9/008; F03D 9/10; H02J 3/383; H02J 3/386; H02J 3/387; H02J 2300/20; H02J 2300/22
USPC .......................................................... 307/84
See application file for complete search history.

(56) References Cited

U.S. PATENT DOCUMENTS

| | | | |
|---|---|---|---|
| 4,021,323 A | 5/1977 | Kilby et al. | |
| 4,341,607 A | 7/1982 | Tison | |
| 4,352,722 A | 10/1982 | Ohkawa | |
| 6,525,263 B2 | 2/2003 | Muller | |
| 6,745,105 B1 | 6/2004 | Fairlie et al. | |
| 7,906,007 B2 | 3/2011 | Gibson et al. | |
| 2005/0109394 A1 | 5/2005 | Anderson | |
| 2007/0277870 A1 | 12/2007 | Wechsler | |
| 2008/0135403 A1 | 6/2008 | Jang | |

(Continued)

FOREIGN PATENT DOCUMENTS

GB 2405742 B 2/2008

*Primary Examiner* — Hal Kaplan
(74) *Attorney, Agent, or Firm* — Adam R. Stephenson, Ltd.

(57) ABSTRACT

A new system for producing electricity and fuel to produce electricity has 1) at least two sources of electricity, comprising any two of photovoltaic energy, tidal energy capture, wind mills and the utility interconnect system; 2) an alkaline electrolyzer including an alkaline fluid container, an alkaline fluid, an anode, a cathode and a thin foil; 3) the alkaline electrolyzer positioned downstream from a means for generating low voltage waves sufficient to lower the ground energy of the water, the low voltage means being connected to the electrical distribution box and providing treated water; 4) a fuel cell being connected to an electrical distribution box that is capable of routing electricity from the fuel cell, the fuel cell also being connected to the hydrogen storage area to receive hydrogen gas to convert to electrical energy for dispersion to the utility interconnect system and/or the system for producing electricity; 5) an electricity distribution box, connected to the current best energy source to the alkaline electrolyzer to produce hydrogen for storage and from the fuel cell back into the utility interconnect system; and 6) storage units for hydrogen and oxygen gases, the storage units comprising large containers suited to maintaining gas compression.

4 Claims, 1 Drawing Sheet

(56) References Cited

U.S. PATENT DOCUMENTS

| | | |
|---|---|---|
| 2009/0025315 A1 | 1/2009 | Gutfleisch |
| 2012/0222967 A1 | 9/2012 | Oakes |
| 2014/0298810 A1 | 10/2014 | Robinson |

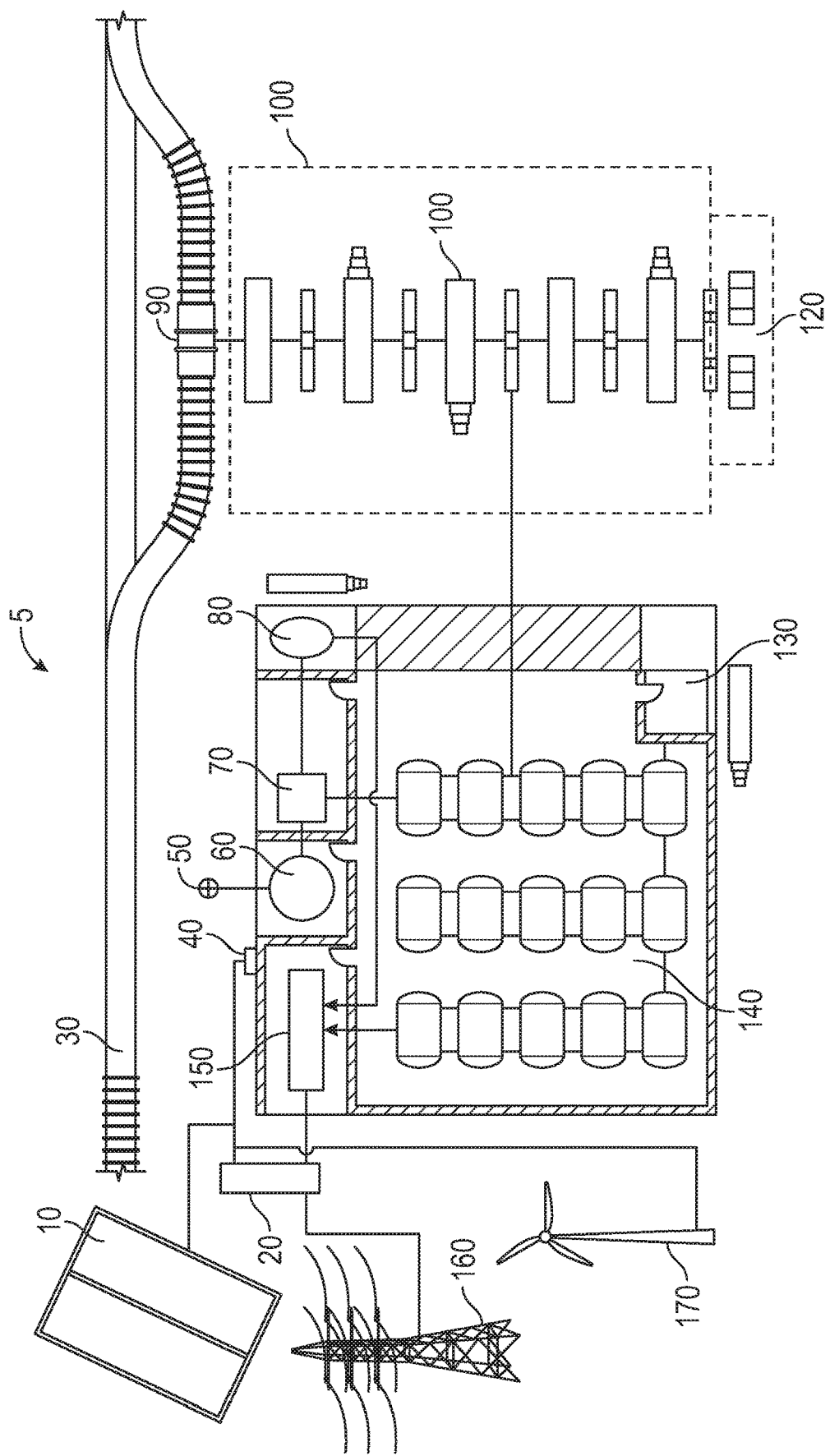

SOLAR HYDROGEN GENERATION AND OFF-PEAK STORAGE

RELATED APPLICATION

This nonprovisional application claims the benefit of U.S. Provisional Patent Application Ser. No. 62/525,056, filed on Jun. 26, 2017.

TECHNICAL FIELD

This invention generally relates to power generation systems and more particularly to providing an even source of electricity by storing power more efficiently in hydrogen.

BACKGROUND

Many power systems are incapable of generating power at all times of the day. Solar systems produce a high level of power during the daylight hours, but as the sun wanes, its capacity diminishes rapidly. As the wind speed decreases away from dawn and dusk, turbines stand idle. Solutions to this include storing the energy absorbed during daylight hours in batteries and chemicals. Chemical storage has been associated with high losses of energy.

SUMMARY

A system for producing electricity and fuel to produce electricity has 1) at least two sources of electricity, comprising any two of photovoltaic energy, tidal energy capture, wind mills and the utility interconnect system; 2) an alkaline electrolyzer including an alkaline fluid container, an alkaline fluid, an anode, a cathode and a thin foil; 3) the alkaline electrolyzer positioned downstream from a means for generating low voltage waves sufficient to lower the ground energy of the water, the low voltage means being connected to the electrical distribution box and providing treated water; 4) a fuel cell being connected to an electrical distribution box that is capable of routing electricity to and from the fuel cells, the fuel cell also being connected to the hydrogen storage area to receive hydrogen gas to convert to electrical energy for dispersion to the utility interconnect system and/or the system for producing electricity; 5) an electricity distribution box, connected to the current best energy source to the alkaline electrolyzer to produce hydrogen for storage and from the fuel cell back into the utility interconnect system; and 6) storage units for hydrogen and oxygen gases, the storage units comprising large containers suited to maintaining gas compression.

The system for producing electricity and fuel also includes a railroad spur for rail cars to receive hydrogen tubular trailer fills. Optionally, the system for producing electricity and fuel also has a truck delivery port. Alternatively, the system for producing electricity and fuel also has a canopy for solar panels, the canopy covering the entire system and the areas for loading hydrogen onto rail cars and trucks.

BRIEF DESCRIPTION OF THE DRAWINGS

The foregoing and further and more specific objects and advantages of the instant invention will become readily apparent to those skilled in the art from the following detailed description of a preferred embodiment thereof, taken in conjunction with the drawings in which.

The FIGURE is a schematic of my inventive power system, showing the energy sources and hydrogen and oxygen storage to regenerate more power.

DETAILED DESCRIPTION

I have been tracking developments in the power generation industry for some time, identifying the problems discussed above and personally exploring solutions. I have recently discovered a way for greater efficiency and day-round power generation at the lowest power consumption.

Herein I disclose a hydrogen and oxygen generation plant using alkaline or another electrolytic process and water that is first subjected to zero-point energy technology. Zero-point energy technology is an action that weakens the molecular bond between hydrogen and oxygen, allowing dramatic lowering of the electrical input for the subsequent electrolytic splitting of the water molecule. This enables large-scale hydrogen production from water using alternative power sources including but not limited to sun, wind, tides, geothermal, etc., and night-time grid power to be stored in batteries or grid power for later peak demand.

As the energy storage medium, hydrogen can be converted back to electricity with less loss of voltage providing uninterrupted power supply (UPS), or during high demand electrical consumption through use of a fuel cell. Hydrogen can be combined with oxygen in an oxygen-enriched gas turbine as well to produce electricity. This process of using zero-point energy technology is entirely renewable and 100% carbon and emission free. This energy system is dependable, regardless of time of day or year.

The system preferably utilizes multiple energy sources, including solar, wind, and power from an electrical utility, such that at any power costs can be optimized. In another preferred embodiment, the equipment used to produce hydrogen gas runs constantly, producing hydrogen for storage and electricity generation when other power sources are less available. Hydrogen gas has numerous uses, including but not limited to operating special, low-pollution vehicles, powering the plant at which it is produced and numerous chemical uses. The resulting oxygen is also clean and can also be purified for chemical and even medical uses. Both can provide additional income streams for the plant.

This method of producing hydrogen is superior to the current popular method involving natural gas, as obtaining hydrogen from the water molecule does not release any carbon byproduct. Thus, it helps avoid the freeing of carbon in natural gas deposits and release of carbon upon obtaining hydrogen. Another improvement is that water is cheaply and easily obtainable and does not require expensive steps such as processing and shipping.

The FIGURE shows an exemplary layout of the system 5, which is powered by, at various times, a solar collecting system 10, wind power 170, and/or the utility interconnect 20 that also carries power to the utility grid 160. These are connected to the energy generation system via the service panel distribution box 40. Critical to my system are a fuel cell 150 and alkaline water electrolyzer 70, which are discussed in detail below. Because the system saves energy for later use in the form of hydrogen gas from water, there is preferably a water storage container 60, as well as a groundwater source 50. Hydrogen storage is extensive, including a hydrogen storage containment area 140 and hydrogen tubular trailer fills 100. Hydrogen and oxygen gas or liquid hydrogen can be obtained and shipped out via rail cars 90 on a rail line 30 or via trucks and small vehicles 120. Splitting water also produces oxygen gas, for which there is an oxygen storage facility 80. A separate room 130 houses hydrogen cylinder filling and storage.

Ground water from source 50 is purified and degassed after entering the storage tank 60 and before entering the electrolyzer 70 which has a secondary tank (not shown). Removing ions is not necessary if they are appropriate to the alkaline electrolysis. The purified water is subjected to low-voltage current through a metal stack (not shown) that creates vibrating zero point energy quantum waves that weaken the molecular force binding hydrogen and oxygen in the water molecule. The energy of the molecule is reduced toward ground state energy level, the lowest possible energy that a quantum mechanical system has. With that strong bond weakened, much lower voltage is needed to separate hydrogen and oxygen by vibration. Lower voltage requires less energy and thereby provides a significantly beneficial cost savings compared to other technology for splitting the water molecule.

Alkaline electrolysis of water is a respected process to produce pure hydrogen and oxygen. There is active research to increase its efficiency. Currently hydrogen appears to be collected more efficiently with natural gas; however, natural gas pollutes the air and its price and price volatility are greater than that of water. Also hydrogen and oxygen from fossil fuels may be contaminated with carbon monoxide, which does not occur with electrolysis of water. Prior water electrolysis methods have required excess energy or overpotential to sufficiently activate the molecules for separation. Once I have applied low voltage current, the cost of water electrolysis drops markedly.

After the application of our low voltage to lower the energy requirement for oxygen-hydrogen separation, DC current is applied to enable oxygen to form on the positive anode and hydrogen gas to form on the negative cathode. The chemical reactions are different. At the anode, an oxidation action occurs, with oxygen being generated and electrons entering the anode to supply electrical current. At the cathode, electrons are provided to hydrogen protons that enable the hydrogen to form H2 gas, a reduction reaction. One or both of the two different gases are collected separately to produce an oxygen supply and/or a hydrogen supply.

Additional factors can be adjusted to increase the efficiency further. Pressure of the system can be raised to partially compress the hydrogen gas as it is produced. Another example is adding electrolytes to pure water to increase conductivity of electricity (e.g., such as salts, or acids or bases). Salt cations must have lower electrode potential than H+ and include Li+, Rb+, K+, Cs+, Sr++, Ba++, Na+, Ca++ and Mg++. Using an acid may be preferable as it merely introduced more H+. Popular alkaline solutions include potassium hydroxide (KOH) or sodium hydroxide (NaOH). Common table salt (NaCl) is not preferred as the chloride may collect as a noxious gas. Electrocatalysts also can help increase efficiency and further reduce the electrical requirement.

The alkaline electrolytic chamber has two electrodes, an anode and a cathode, separated by thin porous foil that preferably has a thickness between 0.050 and 0.5 mm. The foil is not conductive to ions, thereby avoiding electrical shorts between the anode and cathode. Additionally, the foil separates the two gases, whose combination could be explosive. A preferred material is ZIRFON, a composite of zirconium and polysulfone. Preferred material for the electrodes include but are not limited to nickel, which is considered more stable to oxygen exposure than other related metals.

For larger electricity generation, the single fuel cell described above is stacked with many other fuel cells. Alternatively, the entire structure in the drawing has a canopy for solar panels, the canopy also covering the areas for loading hydrogen onto rail cars and trucks.

Although specific embodiments have been illustrated and described herein, those of ordinary skill in the art will appreciate that any arrangement calculated to achieve same purposes can be substituted for the specific embodiments shown. This disclosure is intended to cover any and all adaptations or variations of various embodiments of the invention, it is to be understood that the above description has been made in an illustrative fashion, and not a restrictive one. Combinations of the above embodiments, and other embodiments not specifically described herein will be apparent to those of skill in die art upon reviewing the above description. The scope of various embodiments of the invention includes nay other applications in which the above structures and methods are used. Therefore, the scope of various embodiments of the invention should be determined with reference to the appended claims, along with the full range of equivalents to which such claims are entitled.

In the foregoing description, if various features are grouped together in a single embodiment for the purpose of streamlining the disclosure, this method of disclosure is not to be interpreted as reflecting an intention that the claimed embodiments of the invention require more features than are expressly recited in each claim. Rather, as the following claims reflect, inventive subject matter lies in less than all features of a single disclosed embodiment. Thus the following claims, and such other claims as may later be added, are hereby incorporated into the description of the embodiments of the invention, with each claim standing on its own as a separate preferred embodiment.

Reference throughout this specification to an "embodiment," an "example" or similar language means that a particular feature, structure, characteristic, or combinations thereof described in connection with the embodiment is included in at least one embodiment of the present invention. Thus appearances of the phrases an "embodiment," and "example," and similar language throughout this specification may, but do not necessarily all refer to the same embodiment, to different embodiments, or to one or more of the figures. Additional, reference to the words "embodiment", "example" or the like for two or more features, elements, etc., does not mean that the features are necessarily related, dissimilar, the same, etc.

Each statement of an embodiment or example is to be considered independent of any other statement of an embodiment despite any use of similar or identical language characterizing each embodiment. Therefore, where on embodiment is identified as "another embodiment," the identified embodiment is independent of any other embodiments characterized by the language "another embodiment." The features, functions and the like described herein are considered to be able to be combined in whole or in part one with another as the claims and/or art may direct, either directly or indirectly, implicitly or explicitly.

As used herein, "comprising," "including," "containing," "is," "are," "characterized by," and grammatical equivalents thereof are inclusive or open-ended terms that do not exclude additional un-recited elements or method steps. "Comprising" is to be interpreted broadly and including the more restrictive terms "consisting of" and "consisting essentially of."

Reference throughout this specification to features, advantages, or similar language does not imply that all of features and advantages that may be realized with the present invention should be or are in any single embodiment of the invention. Rather, language referring to the features and advantages is understood to mean that a specific feature, advantage or characteristic described in connection with an embodiment is included in at least one embodiment of the present invention. Thus, discussion of the features and advantages, and similar language, throughout this specification may, but does not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

The invention claimed is:

1. A system for producing electricity and fuel to produce electricity, the system comprising:
 a. at least two sources of electricity, comprising an alkaline electrolyzer comprising an alkaline fluid container, an alkaline fluid, an anode, a cathode, and a thin foil between the anode and the cathode, and any of photovoltaic energy, a tidal energy capture, and one or more wind mills;
 b. the alkaline electrolyzer positioned downstream from an energy source for generating low voltage waves sufficient to lower the ground energy of water, the energy source connected to an electrical distribution box and providing hydrogen gas and oxygen gas;
 c. at least one fuel cell connected to the electrical distribution box configured to route electricity to and from the at least one fuel cells, the at least one fuel cell also connected to a first hydrogen storage area to receive hydrogen gas to convert to electrical energy for dispersion to a utility interconnect system and/or a system for producing electricity;
 d. the electrical distribution box, connected to the energy source with the highest efficiency from among the at least two sources of electricity and to the alkaline electrolyzer to produce hydrogen for storage and to distribute hydrogen from the fuel cell back into the utility interconnect system; and
 e. one or more additional storage areas, the one or more additional storage areas comprising large containers suited to maintain gas compression, wherein the one or more additional storage areas are configured to store hydrogen and oxygen.

2. The system for producing electricity and fuel of claim 1, further comprising a railroad spur configured to receive one or more rail cars comprising one or more hydrogen tubular trailer fills.

3. The system for producing electricity and fuel of claim 1, further comprising a truck delivery port.

4. The system for producing electricity and fuel of claim 1, further comprising a canopy for solar panels, the canopy covering the entire system and one or more areas for offloading hydrogen fuel onto one or more rail cars and one or more trucks.

* * * * *